United States Patent Office 2,857,680
Patented Oct. 28, 1958

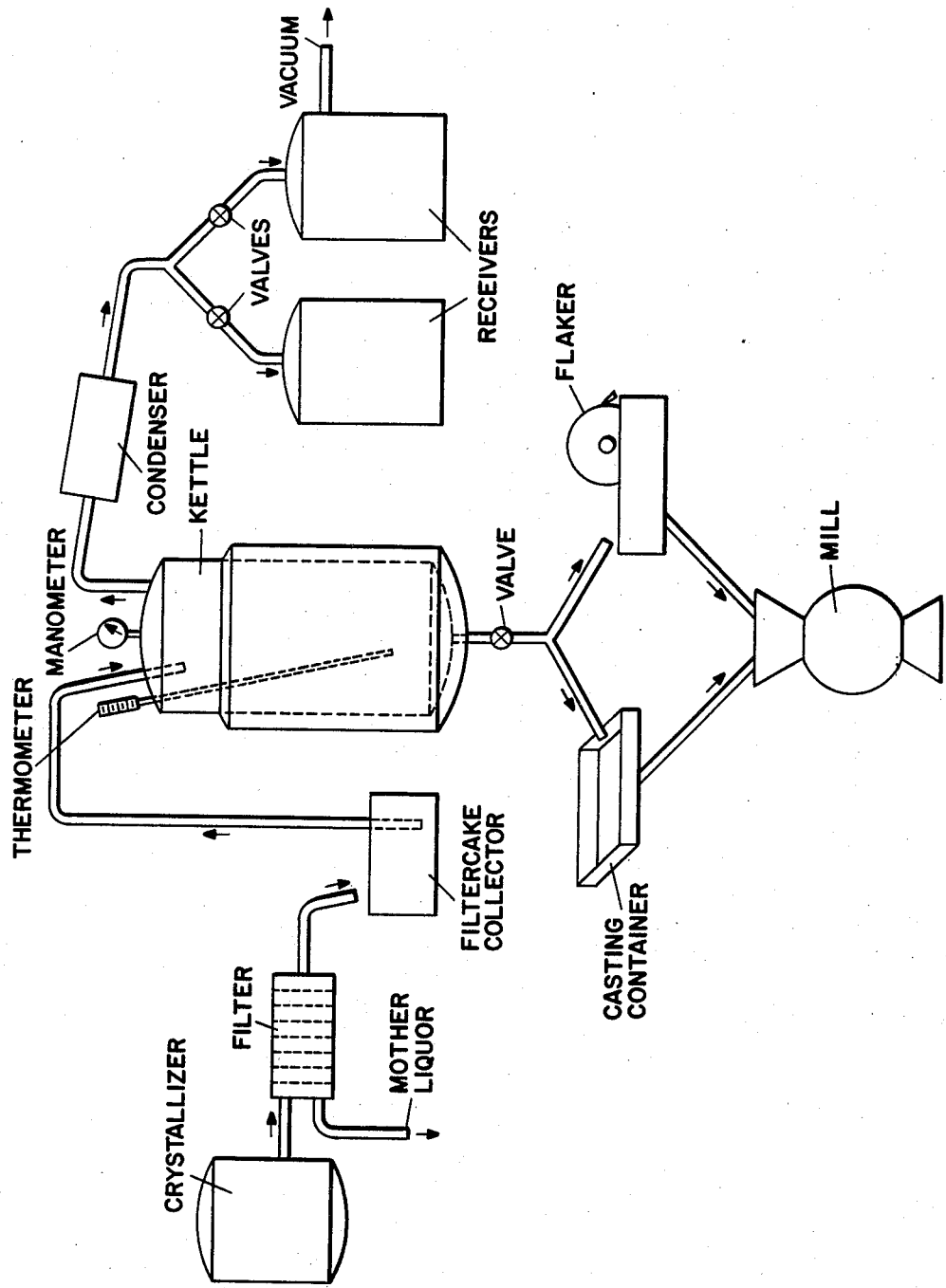

2,857,680

DRYING OF ALKANEDIOL DICARBAMATES

Sidney Beinfest, Berkeley Heights, Joseph Halpern, New Providence, and Sidney Gister, Bound Brook, N. J., assignors to Berkeley Chemical Corporation, Berkeley Heights, N. J., a corporation of New Jersey Application August 15, 1956, Serial No. 604,075

6 Claims. (Cl. 34—15)

This invention relates to new and useful improvements in drying and increasing the bulk density above that normally obtained of alkanediol dicarbamates. More particularly it relates to a process of the nature indicated wherein highly concentrated suspensions of alkanediol dicarbamates are dried at reduced pressures and at temperatures above their melting points but below the degradation point.

Alkanediol dicarbamates such as butane 1,3 diol dicarbamate and 2-methyl-2-n-propyl-propane 1,3 diol dicarbamate have been finding increasing utility in the plastic industry and particularly for medicinal purposes as tranquilizing drugs.

These materials have been prepared in general by an exchange reaction between a diol and ethyl carbamate with a solvent or by reacting a diol with 2 moles of phosgene and then ammonolysis of the bis (chloro carbamate). They can also be prepared by the direct reaction of urea with diols by the utilization of an excess of the latter in the presence of an inert diluent having a boiling point above 200° C. They can also very advantageously be prepared by the improved methods disclosed in copending applications, Serial No. 560,856 filed Jan. 23, 1956, and Serial No. 568,715 filed Mar. 1, 1956.

Because the end uses of these alkanediol dicarbamates, however prepared, require products of high purities, after preparation they are conventionally crystallized from volatile liquids, separated from most of the mother liquid by mechanical means, such as filtration or centrifuging and then dried.

Their drying is done by standard means, e. g., rotary kiln, atmospheric shelf and vacuum shelf dryers with a normal cycle of 30 hours. All these methods result in products of rather low bulk density, e. g., for 2-methyl-2-n-propyl-propane 1,3 diol dicarbamate 0.30–0.37 gms./cc. This in turn results in low flowability and consequent clumping in the hoppers. In addition because the crystals are electrostatic dusting is a problem. These difficulties are particularly undesirable in pharmaceuticals because of the effect on operations and losses in handling.

These characteristics further lead to problems in tabletting of the powders because of poor compressibility. Excessively large tablets are required for standard dosages and concomitant large packages. Because of these factors wet granulation has been necessary with consequent regrinding to improve flowability. These expedients are costly and tablet size is still too large.

This invention provides an improved method of overcoming all these beforementioned difficulties. The method comprises stripping the volatile liquid from a highly concentrated suspension of an alkanediol dicarbamate at subatmospheric pressures and at a temperature above the melting point of the alkanediol dicarbamate but below the degradation temperature. The thus dried chemical in liquid form can then conveniently be flaked or cast in the conventional manner and then ground to the desired particle size.

It is surprising to learn that in this manner the bulk density can be improved as much as 100%, e. g., for 2-methyl-2-n-propyl-propane 1,3 diol dicarbamate to 0.7 gm./cc. after grinding. The flowabiilty is increased and the need for wet granulation avoided. The dried material can be tabletted directly or granulations can be prepared by dry slugging. All this is obtained with a reduction in drying time requirements to 3–6 hours. The tablets produced have a volume decrease of 25% or more for the same dosage as compared to tablets prepared from conventionally dried material.

The exact temperature figures vary for each compound but for butane 1,3 diol dicarbamate the temperature utilized is in the range of about 152°–170° C. and for 2-methyl-2-n-propyl-propane 1,3 diol dicarbamate it is in the range of about 107°–150° C. The figures can be determined empirically for any given compound.

The alkanediol dicarbamates, to which this method can very advantageously be applied, are those derived from alkanediols having the general formula

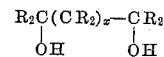

where R is a radical selected from the group consisting of hydrogen, alkyl, cyclic or aryl radicals and $x$ is any number including zero. Where x is 2 or more an alkylene, ethynyl group or a cyclic group can be used. Typical diols used are butane 1,3 diol, and 2-methyl-2-n-propyl-propane 1,3 diol. Other examples are listed below. It is to be understood that the R groups can be the same or different on each of the carbon atoms. The process is especially effective and desirable for the drying of butane 1,3 diol dicarbamate and 2-methyl-2-n-propyl-propane 1,3 diol dicarbamate.

The term "highly concentrated suspension" connotes the suspension of the alkanediol dicarbamate after crystallization and after the major proportion of the mother liquid has been removed by mechanical separation such as centrifuging or filtration. The term "filter cake" is also utilized to connote this type suspension which normally has a liquid content of about 20–70 wt. percent.

The subatmospheric pressures employed are conveniently in the range of about 15 to 400 mm. Hg. The temperatures utilized, as stated previously, are above the melting point of the particular alkanediol dicarbamate at the pressure employed but below its degradation point.

The volatile liquids from which the alkanediol dicarbamates are crystallized or recrystallized are water or typical organic solvents and mixtures of the two. The organic volatile liquids include aromatic hydrocarbons such as benzene, toluene, xylene, etc. Alcohols such as methanol and higher can be employed. With the lower alcohols it is advantageous to also use water to minimize excessive solubility. Other oxygenated aliphatics such as ketones, aldehydes, esters, ethers etc. also have utility with water again being used with the lower members.

The process of this invention is illustrated by the flow diagram.

This invention will be better understood by reference to the following examples of the treatment of the indicated compounds according to the process of this invention.

EXAMPLE I

*Drying of butane 1,3 diol dicarbamate*

A filter cake of butane 1,3 diol dicarbamate crystallized from xylene is treated at 160° C. and 100 mm. Hg pressure to strip off all the solvent. The bulk density of the final product is 0.8 gms./cc. after grinding as compared to 0.5 gms./cc. for a control dried on an atmospheric shelf.

EXAMPLE II

*Treatment of 2-methyl-2-n-propyl-propane 1,3 diol dicarbamate*

A filter cake of 2-methyl-2-n-propyl-propane 1,3 diol dicarbamate crystallized from 30% ethanol was dried at 110° C. above its melting point but below its degradation temperature at 100 mm. Hg with the pressure lowered finally to 20 mm. Hg. After 4 hours all the solvent was stripped off. The final product had a bulk density of 0.6 gms./cc. after grinding or about a 100% improvement over the control. It had all of the advantages listed above and none of the disadvantages of the control in further tabletting operations.

The process of this invention is applicable to other organic chemicals including polycarbamates to which the stipulated pressure and temperature controls are applicable as well as other pharmaceuticals having a melting point below 180° C. and a degradation point above that figure.

The advantages of this invention have been listed and others will be apparent to the skilled in the art. Fine organic chemicals of increased bulk density, which are more easily amenable to subsequent processing, are economically obtained. The process has resulted in very substantial manufacturing savings.

It can also be used where it is desired to screen or filter the melted liquid to remove foreign matter.

It is understood that this invention is not limited to the specific examples which have been offered merely as illustrations and that modifications may be made without departing from the spirit of the invention.

What is claimed is:

1. A process for drying and increasing the bulk density of an alkanediol dicarbamate contained as a high concentration of solids in a heterogeneous system with a volatile liquid which comprises stripping off the volatile liquid from the alkanediol dicarbamate at subatmospheric pressure and at a temperature above the melting point of the alkanediol dicarbamate at the pressure utilized, but below its decomposition temperature.

2. The process of claim 1 in which the alkanediol dicarbamate is butane 1,3 diol dicarbamate and the temperature to which it is heated is in the range of about 152°–170° C.

3. The process of claim 1 in which the alkanediol dicarbamate is 2-methyl-2-n-propyl-propane 1,3 diol dicarbamate and the temperature to which it is heated is in the range of about 107°–150° C.

4. The process of claim 1 in which the volatile liquid is an organic liquid.

5. The process of claim 1 in which the liquid is water.

6. A process for drying and increasing the bulk density of an organic chemical selected from the group consisting of alkanediols and alkanediol dicarbamates contained as a high concentration of solids in a heterogeneous system with a volatile liquid which comprises stripping off the volatile liquid from the organic chemical at a subatmospheric pressure and at a temperature above the melting point of the organic chemical at the pressure utilized, but below its decomposition temperature.

References Cited in the file of this patent

UNITED STATES PATENTS

| | | |
|---|---|---|
| 2,001,658 | Williams | May 14, 1935 |
| 2,267,133 | Porter | Dec. 23, 1941 |
| 2,400,748 | Flosdorf | May 21, 1946 |
| 2,439,384 | Fetzer | Apr. 13, 1948 |
| 2,445,120 | Levinson et al. | July 13, 1948 |
| 2,585,825 | Nyrop | Feb. 12, 1952 |
| 2,643,180 | Miller | June 23, 1953 |